L. E. v. CZILLINGER.
DEVICE FOR CONTROLLING HORSES.
APPLICATION FILED NOV. 27, 1908.

925,873.

Patented June 22, 1909.

UNITED STATES PATENT OFFICE.

LUDWIG EDLER V. CZILLINGER, OF PITTSBURG, PENNSYLVANIA.

DEVICE FOR CONTROLLING HORSES.

No. 925,873.            Specification of Letters Patent.          Patented June 22, 1909.

Application filed November 27, 1908. Serial No. 464,568.

*To all whom it may concern:*

Be it known that I, LUDWIG EDLER V. CZILLINGER, a subject of the Emperor of Austria-Hungary, residing at Pittsburg, in the county of Allegheny and State of Pennsylvania, have invented certain new and useful Improvements in Devices for Controlling Horses, of which the following is a specification, reference being had therein to the accompanying drawing.

This invention relates to a device for controlling horses, particularly run-away and fractious animals and the object thereof is to provide a device in a manner as hereinafter set forth whereby a driver can lower the head of a horse and maintain the horse's head in such position to prevent the horse from running away, as it is a well known fact that a horse cannot run with its head lowered, such device enabling the driver to readily control the horse.

The controlling device is so constructed whereby it can be used in connection with the present type of harness or bridle and is detachable so as to allow the moving of the device after the horse has been subdued.

Figure 1:
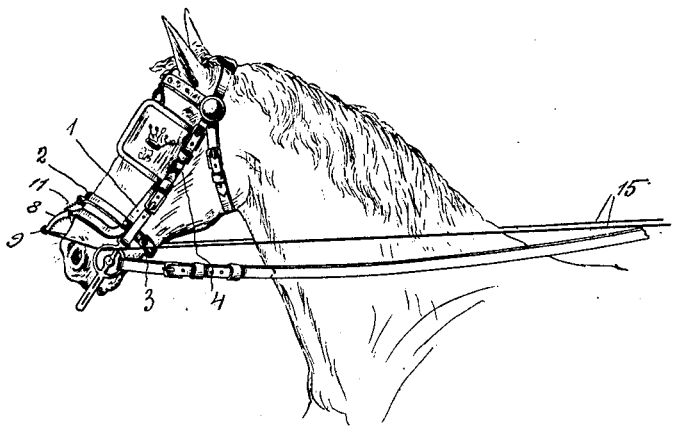
Figure 2:
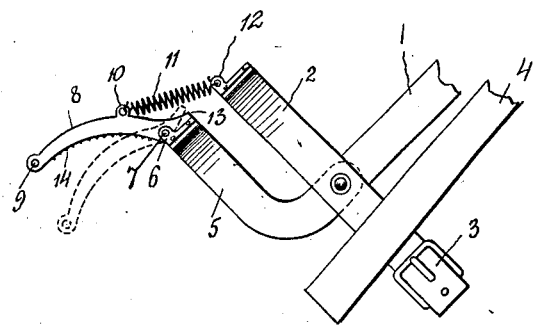

In describing the invention in detail, reference is had to the accompanying drawings which form a part of this specification, and wherein like reference characters denote corresponding parts throughout the several views, and in which, Figure 1 is a side elevation showing the adaptation of the device in connection with the head of a horse. Fig. 2 is an enlarged side elevation of the device.

A controlling device in accordance with this invention comprises a head strap which is indicated by the reference character 1 and is adapted to extend over the horse's head behind the ears whereby the device is maintained in position. The controlling device further comprises a nose strap 2 which is connected to the ends of the head strap 1 and is provided with a buckle 3 so that the nose strap can be connected together and easily fixed to the horse's head under the bridle 4.

Pivotally connected to the sides of the nose strap 2 is a metallic bridge 5, the bridge being substantially yoke-shaped with the lower ends of its arms extending rearwardly and pivotally connected to the strap 2.

Formed integral with the bridge 5 approximately centrally thereof are the lugs 6 between which is pivoted through the medium of a pin 7 a forwardly extending curvilinear bar 8 having its free end provided with an opening 9. The lower face of the bar 8 is formed with prongs or protuberances 14, while projecting from the upper face of said bar is an apertured lug 10 to which is connected one end of a spring 11, the other end of the spring 11 being attached to an apertured lug 12 carried by the strap 2. The bar 8 is pivotally connected to the lugs 6 at a point removed from its rear end, said rear end being indicated by the reference character 13 and adapted to constitute means for limiting the upward movement of the bar 8 due to the action of the spring 11. The spring 11 not only constitutes a means for maintaining the bar 8 in an elevated position but when the end 13 of the bar 8 engages with the bridge 5, the bridge 5 is also elevated due to the action of the spring 11, as will be evident. Connected to the apertured end 9 of the bar 8 are the auxiliary reins 15 which extend through the bit rings of the bridle.

To operate the device, it is only necessary for the driver to pull upon the auxiliary reins which moves the bridge 5 rearwardly against the strap 2, after which the bar 8 will move downwardly and engage the horse's nose. When the bar 8 and bridge 5 are shifted to the position just stated, the protuberances 14 will prick the horse's nose and cause him to lower his head. The horse's head can be maintained in such position by retaining the pull upon the horse's head.

From a humane standpoint, the protuberances are not sufficient to hurt the horse, but simply annoy the animal and cause him to lower his head so as to prevent him from running away and thereby enabling the driver to control the animal.

What I claim is:

1. A controlling device for the purpose set forth comprising a head strap, a nose strap attached thereto, a metallic bridge substantially yoke-shaped in contour and having the ends of its arms extending rearwardly and pivotally connected to the nose strap, a bar pivotally connected intermediate its ends to said bridge, protuberances depending from said bar, means connected with the outer end of said bar for shifting it in one direction, and means carried by the nose strap and connected with said bar to normally maintain the bar and bridge in an elevated position.

2. A controlling device for the purpose set forth comprising a head strap, a nose strap, a shiftable nose bridge pivotally connected to said nose strap, a bar pivotally connected intermediate its end to said bridge, said bar provided with protuberances on its lower face, means carried by the nose strap and connected with the bar for normally maintaining it and said bridge in an elevated position, and means connected with the outer end of said bar for shifting the bridge rearwardly causing the bar to engage the horse's nose.

3. A controlling device for the purpose set forth comprising a nose strap, a shiftable nose bridge pivotally connected to said strap, a bar pivotally connected intermediate its ends to said bridge, means connected with the nose strap and with the bar for maintaining the bar and bridge normally in an elevated position, and means connected with the outer end of said bar for throwing the bridge rearwardly thereby causing the lowering of the bar to engage the horse's nose.

4. A controlling device for the purpose set forth comprising a nose strap, a yoke-shaped bridge having the ends of its arms pivotally connected to said nose strap, a bar pivotally connected intermediate its ends to said bridge, means for normally maintaining said bar and bridge in an elevated position, and means connected with the outer end of the bar for throwing the bridge rearwardly thereby causing the lowering of the bar to engage the horse's nose.

In testimony whereof I affix my signature in the presence of two witnesses.

LUDWIG EDLER V. CZILLINGER.

Witnesses:
A. H. RABSÁG,
MAX H. SROLOVITZ.